Feb. 19, 1929.
L. A. DEMOREST
1,702,500
CORN SHOCKING MACHINE
Filed Nov. 9, 1922.
3 Sheets-Sheet 1
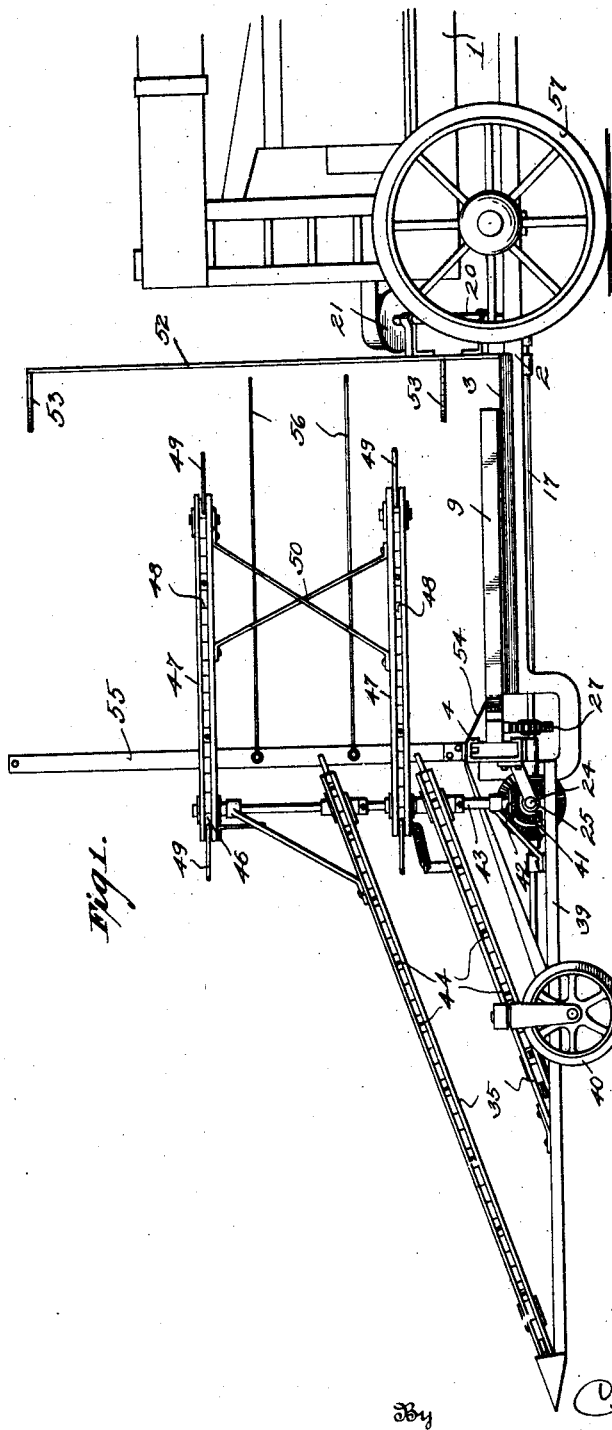
Inventor
Leroy A. Demorest
By C. C. Shepherd
Attorney

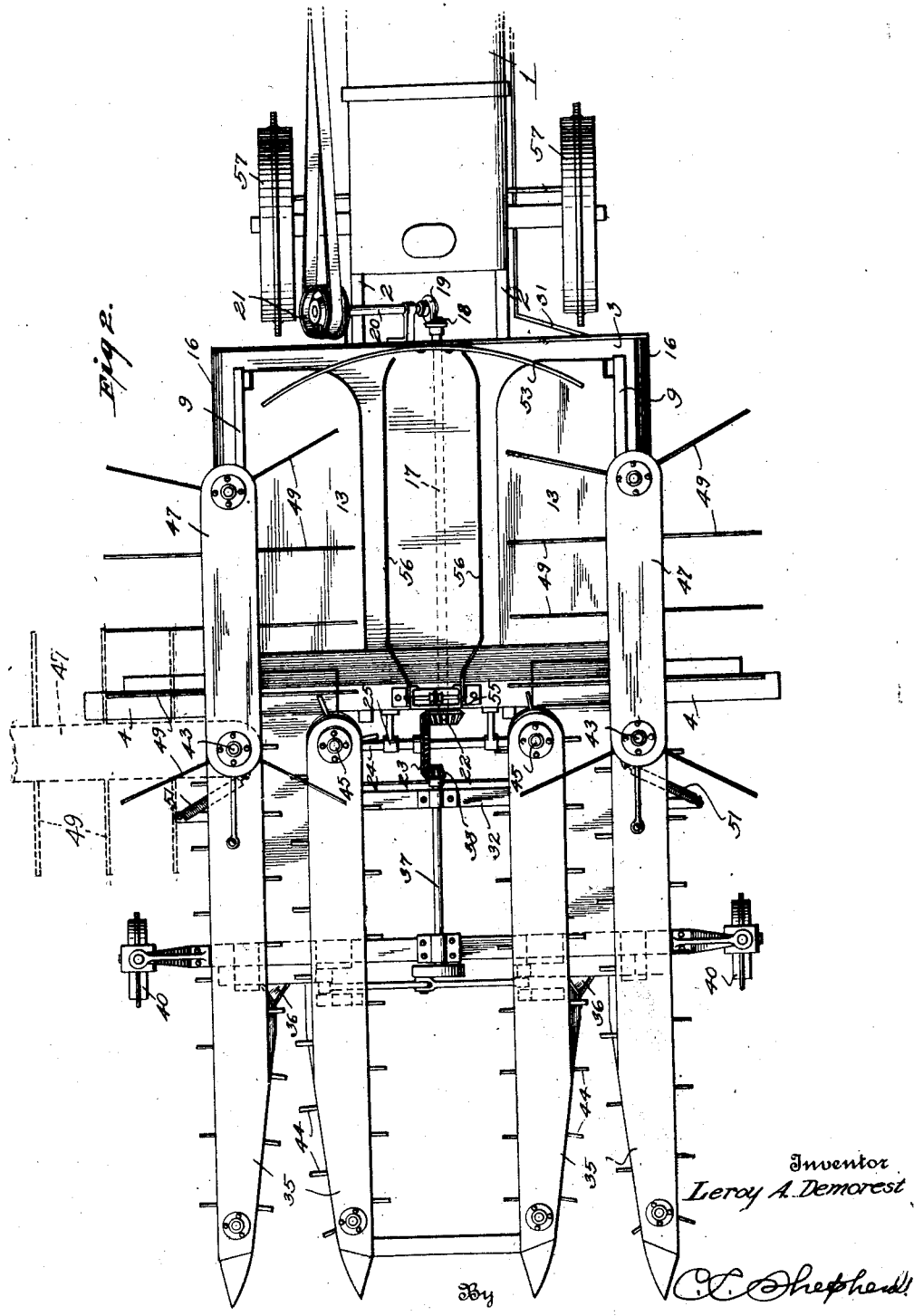

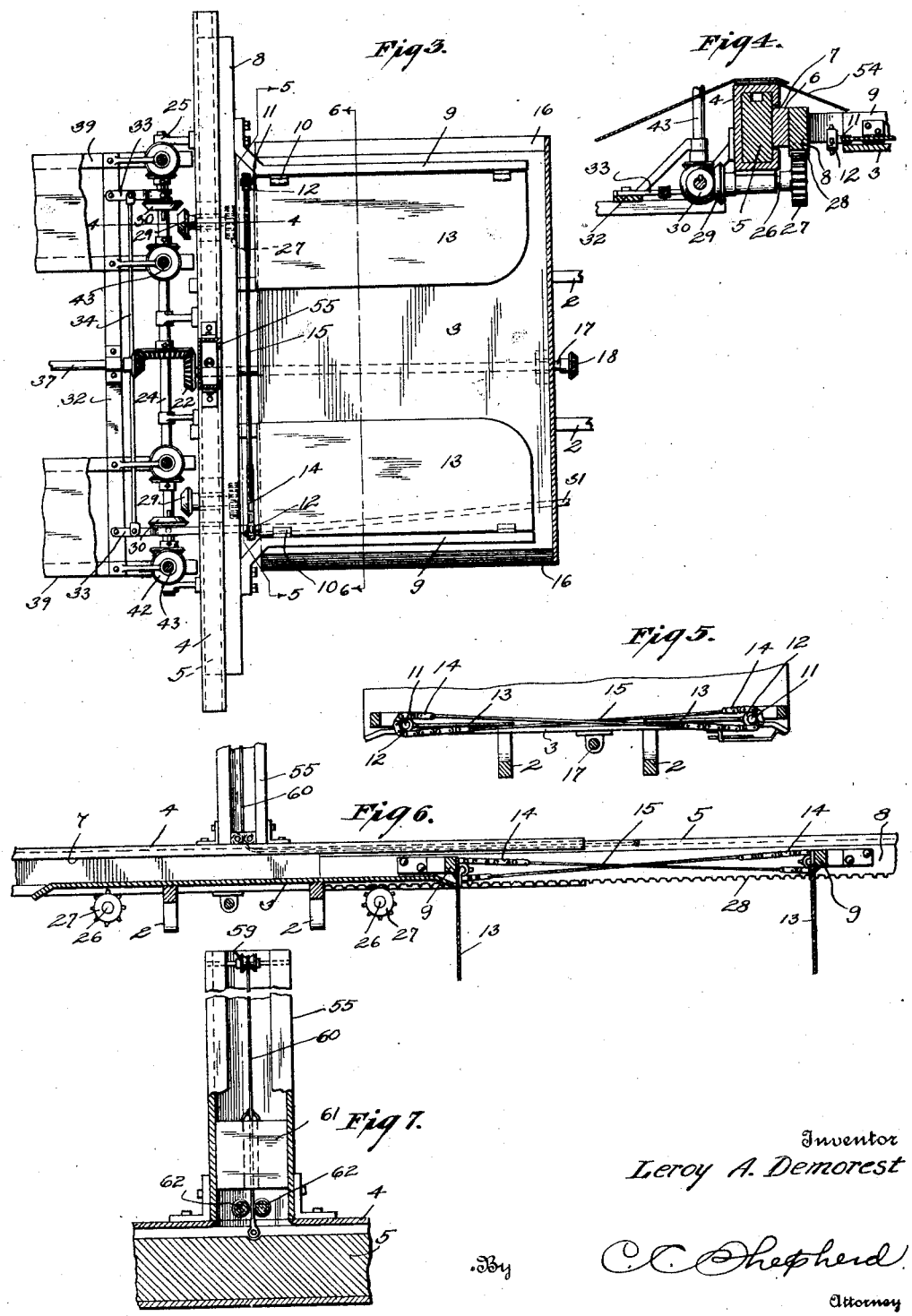

Patented Feb. 19, 1929.

1,702,500

UNITED STATES PATENT OFFICE.

LEROY A. DEMOREST, OF COLUMBUS, OHIO.

CORN-SHOCKING MACHINE.

Application filed November 9, 1922. Serial No. 599,818.

The present invention is directed to improvements in corn shocking machines, and has for its primary object to provide a device of this character so constructed that the shocks can be discharged at intervals from either side of the machine.

A further object of the invention is to provide a corn shocking machine provided with means so arranged that it can be propelled across a field to cut two rows of corn, the cut corn being delivered to the shocking mechanism and discharged therefrom in a direction from the standing corn.

Another object of the invention is to provide a shocking machine capable of being mounted and secured in advance of a tractor, whereby the standing corn can be cut regardless of the angular condition thereof with respect to the ground, and after being cut can be delivered to the shocking mechanism and discharged from the side thereof remote from the uncut corn.

With these and other objects in view, as will appear as the description proceeds, the invention consists in the novel features of construction, combinations of elements and arrangements of parts, and hereinafter to be fully described and pointed out in the appended claims.

In the accompanying drawing:

Figure 1 is a side elevation of the shocking machine,

Figure 2 is a top plan view of the machine,

Figure 3 is a fragmentary top plan view of the shocking mechanism, and illustrating one form of mechanism for controlling the same, Figure 4 is a sectional view on the line 4—4 of Figure 3, Figure 5 is a sectional view on the line 5—5 of Figure 3, Figure 6 is a sectional view taken on the line 6—6 of Figure 3, but showing the wings in a position to discharge a shock, and Fig. 7 is a fragmental detail with parts shown broken away and parts in elevation illustrating a portion of the transverse guide and vertically extending post with associated parts.

Referring to the drawing 1 indicates a tractor, of any well known construction, said tractor having fixed thereto in any suitable manner longitudinal sills 2 and upon which is fixed a metallic platform 3.

Also supported by the sills 2 is a transversely disposed guide 4, said guide being of such length as to have its ends projected beyond the sides of the tractor. Slidable in this guide is a bar 5, said bar having a reduced portion 6 which slides in the slot 7 formed in the rear face of the guide, said reduced portion having fixed thereto a rack bar 8.

Having their rear ends fixed to the rack bar 8 are horizontally disposed arms 9 which are arranged in spaced parallel relation and extend parallel with the ends of the platform 3, said arms having bearings 10 carried thereby in which are rotatably mounted shafts 11, the forward ends of said shafts being provided with sprockets 12. To each shaft 11 is fixed a wing 13 which is adapted to normally rest on the platform 3, and in a position to receive the cut corn as it is being formed into shocks.

Trained around the sprockets 12 are chains 14, said chains having their ends connected by links 15, said links being disposed in crosswise relation, the purpose of which will appear later.

As shown in Figure 3 the wings 13 are disposed immediately above the platform 3, whereas in Figure 6 the wings are shown in a position to one side of the platform 3, and at which time the wings, as shown, are in vertical positions, which necessarily follows when the same have passed from engagement with the platform 3. Since the links 15 are crossed it is obvious that when the bars 9, which carry the wings 13 are moved to the left that the innermost wing 13 will engage against the downturned edges 16 of the platform, and continued movement of the arms 9 to the left will cause the thus engaged wing 13 to swing upwardly, and simultaneously rotate the associated sprocket, thereby causing the chains 14 upon the innermost sprocket to travel, and simultaneously therewith the links 15 will be actuated to swing the opposite wing 13 upwardly to a horizontal position so that the free edge thereof will be so positioned as to pass without interference to the upper surface of the platform 3. Thus it will be seen that the wings 13, after dropping to the position as shown in Figure 5 can be in a simple manner returned to their normal positions as shown in Figure 3.

In order to move the bar 5 longitudinally of the guide 4 a main drive shaft 17 is provided, and extends beneath the platform 3 and centrally thereof, said shaft having a beveled pinion 18 carried thereby which meshes with a similar pinion 19 carried by the shaft 20, said shaft having a pulley 21 thereon which can be driven in any suitable manner from the motor of the tractor 1. The forward end of the shaft 17 has fixed thereto a beveled pinion 22 which meshes with a similar pinion 23 which is fixed to the counter shaft 24, the latter shaft being journaled in suitable bearings 25 supported by the guide 4, as clearly shown in Figure 3 of the drawings. Also supported by the guide 4 are shafts 26, the rear ends of which have secured thereto pinions 27, said pinions being adapted to engage the teeth 28 of the rack bar 8, in a manner to be hereinafter described. To the forward ends of the shafts 26 are fixed beveled friction gears 29 which are adapted to cooperate with the similar gears 30 keyed upon the counter shaft 24, the latter gears being shiftable longitudinally of the shaft 24 to cause said gears to alternately engage the gears 29, whereby the shafts 26 are rotated to move the arms 9 and associated wings 13 transversely of the platform 3 and in the desired direction. In order to shift the gears 30 a hand lever 31 is provided and has its forward end pivotally connected with a cross bar 32, there being an arm 33 also pivotally connected with the bar 32 and is adapted to control the movement of the other gear 30, said lever and arm being pivotally connected by a link 34. Thus it will be seen that upon shifting the lever 31 in one direction a selected gear 30 will engage an adjacent gear 29. As shown in Figure 6 one of the pinions 27 is engaged with the rack teeth 28 and at which time the wings 13 are in their discharging positions. When in this position the gear 30 is in contact with the gear 29 and upon rotation of the shaft 24 rotary movement will be imparted to one of the shafts 26, and the pinion 27 thereof will be rotated and consequently the bar 14 and associated wings 13 will be moved to the left. As the rack bar travels toward the left it finally engages the other pinion 27 and at which time both pinions 27 will be engaged with the rack teeth 28. It will be of course understood that when it is desired to move the bar 4 and its associated wings to a position to the left of the platform 3 that the pinion 27 will be idle while the companion 27 will be active, thus causing the bar 4 to be slid in the guide 4 to a position at the left of the line of travel of the machine. Thus it will be seen that the wings 13 and associated parts can be either moved transversely of the platfrom 3 toward the left or right of the line of travel of the machine.

A conventional form of gathering mechanism is provided, and as usual this mechanism comprises a pair of spaced gathering members 35, said gathering mechanism having associated therewith reciprocating cutting blades 36, said blades being reciprocated through the medium of the shaft 37, said shaft being driven by the beveled gear 38 fixed centrally to the counter shaft 24, said shaft 24 receiving its power, as before stated, through the medium of the driving shaft 17. It will be observed that the rear ends of the frames 39 of the gatherers 35 are pivotally connected with the counter shaft 24 so that when the device is travelling across the field said gathering device or mechanism can adjust themselves to unevenness in the field. This gathering mechanism is supported by ground wheels 40.

Fixed to the outer ends of the counter shaft 24 are beveled gears 41 which mesh with similar gears 42 fixed to the lower ends of the vertical shafts 43. The gathering fingers 44 are controlled by the shafts 43 in any suitable manner, there being a companion shaft 45 for performing this function.

The shafts 43 are provided with vertically spaced sprockets 46, which are fixed thereto and also supported by the shafts 43 are frames 47 in which travel the chains 48, said chains having gathering arms 49 fixed thereto, said arms being formed from resilient metal. It will be observed that when the shafts 43 are rotated that the chains 48 will be caused to travel, and will guide the stalks severed by the cutters 36 to the platform 3. The frames 47 are connected by brace members 50 so that said frames will be compelled to swing in unison. It will be observed that the frames 47 are pivotally connected with the respective shafts 43 and normally lie in the position as shown in full lines in Figure 1, but these frames are capable of being swung outwardly by the shock as the shock is moved transversely of the platform 3, and since the gathering arms 49 are resilient the said arms will readily disengage the corn shock as it is discharged from the platform. In order to return the frames 47 to their normal positions coil springs 51 are provided, said springs yieldably connecting the frames 47 and gatherers 35. In Figure 2, one of the frames 47 is shown, by dotted lines, in the position it will assume when a shock is discharged from the right hand side of the platform 3, it being of course understood that as soon as the shock has been deposited upon the ground that the spring 51 will serve to return the frame to its normal position.

Rising vertically from the rear end of the platform 3 is a plate 52, to the inner face of which, and located near the upper edge thereof, is secured an arcuate bar 53, said bar serving to direct the cut stalks into shock form as they collect upon the wings 13 and platform 3, lateral movement of the shocks being prevented by the frames 47.

To prevent the cut stalks from contacting with the guide 4 as they are fed to the platform 3, an apron 54 is provided and is suitably secured to the guide 4, as more clearly shown in Figure 4 of the drawings.

Mounted with its lower end fixed to the central portion of the guide 4 is a vertically extending post 55. This post has associated therewith, in vertical alignment, resilient spreading arms 56, and it will be obvious that the stalks after being cut will be fed by the arms 49 to the opposite sides of the spreading arms 56. These arms form, in effect, a core for the shock so that when the stalks are tied in shock form the lower ends of the stalks will be held in fanlike formation and separated by the arms 56. It will be observed that these arms are so supported on the post 55 that as the shock is moved laterally of the platform said arms will be withdrawn from the shock as the shock leaves the platform.

It will be observed that the wheels 57 of the tractor follow in a line with the cutters 36 so that during the travel of the machine across the field the stubs left remaining in the ground will be crushed by the wheels 57, which is advantageous, since after the corn crop is harvested other products are planted in the same field.

From the foregoing description it will be seen that the machine can be started at the edge of a corn field and as it travels thereacross two rows of corn will be simultaneously cut. As the machine progresses the shocks are formed upon the wings 13, whereupon the machine is stopped and the wings 13 slid in a direction away from the uncut stalks so that the shocks will be deposited or discharged a sufficient distance away from the uncut stalks to permit the machine when it reaches the other side of the field to turn shortly and cut the next two rows of stalks and in which event the wings are moved in a direction opposite to that in which they had been moved when first crossing the field.

In order to return the platform 3 to its normal position, as shown in Figures 6 and 7 of the drawing the post 55 is equipped at its upper end with a pulley 59 over which is trained a cable 60, said cable having secured to its end a weight 61. The lower end of the cable is fixed to the central portion of the bar 5, said cable being trained around properly located pulleys 62. Assuming that the platform is in the position as shown in Figure 6 it will be apparent that when the shock has been discharged from the wings 13 that the weight, which had been previously elevated, will in its downward movement draw upon the cable 60, thereby returning the rack bar and the associated wings to the position as shown in Figure 3. It will be of course understood that one of the pinions 27 will idle as the rack bar 5 is returned to its normal position.

What is claimed is:

1. In a corn shocking machine, a shock former, and means for moving the former transversely to discharge a shock upon either side of the line of travel of the machine.

2. In a corn shocking machine, shock forming means, and means for moving a shock formed in said forming means transversely of the longitudinal center line of the machine to discharge the form shock selectively at either side of the line of travel of the machine.

3. In a corn shocking machine, a shock former including a pair of hingedly mounted shock supporting wings, means for moving the wings transversely to discharge a shock thereon upon either side of the line of travel of the machine.

4. In a corn shocking machine, a shock former including a platform, a pair of hingedly mounted shock supporting wings, means for moving the wings transversely of the platform to discharge a shock therefrom upon either side of the line of travel of the machine.

5. In a corn shocking machine, shock forming mechanism, gathering means for delivering cut corn to said mechanism and discharge means operating to remove the shocked corn from said mechanism upon the side of the machine remote from the standing or uncut corn irrespectively of the direction of travel of the machine.

6. In a corn shocking machine, a shock former, including a pair of hingedly supported wings, means for supporting the wings in horizontal positions to sustain a shock, means for moving the wings to either side of the line of travel of the machine to cause the wings to assume vertical positions to discharge a shock therefrom, and means for automatically returning the wings to their horizontal positions.

7. In a corn shocking machine, a platform, a shocker including a pair of hingedly supported wings, means for holding the wings in horizontal position to sustain a shock thereon, means for moving the wings transversely of the platform in opposite directions and means to permit the wings to assume vertical positions to discharge a shock therefrom when moved to their extremes of transverse travel.

8. In a corn shocking machine, a shocker, including a pair of horizontally supported wings, means for moving the wings from a horizontal shock sustaining position to a vertical shock discharging position upon either side of the line of travel of the machine.

9. In a corn shocking machine, a shocker, in combination with a motor propelled platform, a pair of hingedly supported wings movable transversely of the platform and held in their horizontal positions when engaged above the platform, means for moving the wings laterally upon either side of the platform to permit the wings to assume vertical positions, means for returning the wings to their positions above the platform, and means for simultaneoulsy swinging the wings from vertical positions to horizontal positions.

10. In agricultural machinery, the combination with a farm tractor, of a corn shocking attachment for said tractor, comprising a frame secured to the tractor and extending in advance thereof, a pair of stalk gatherers on the forward end of said frame, through which stalks of adjoining rows of corn are passed longitudinally along the machine, cutting mechanism for severing stalks from the root portions thereof, a stalk receiver for receiving the severed stalks from the discharge ends of the gatherers, pressers operating on the stalks in the receiver to compress the stalks into shock formation, and mechanism for effecting lateral traverse and discharge of the shocks selectively to either side of the machine and the path of travel of the tractor.

11. In agricultural machinery, the combination with a farm tractor, of a corn shocking attachment for said tractor, comprising a frame secured to the tractor and extending in advance thereof, spaced gathering devices mounted upon the forward end of said frame and arranged to receive in vertical order stalks comprising adjacent rows of corn through which the machine is traveling, cutting means on said frame adjacent said gathering devices for severing the stalks from their root extremities, a stalk receiver formed with said frame, packing devices for effecting the transfer of the stalks from the gathering devices into said receiver, and to compress said stalks, while standing vertically, into shock formation when positioned within the receiver, means for effecting lateral traverse of said receiver to position the formed shocks therein selectively to one side or the other of said tractor, and means for releasing the shocks from said receiver when the latter is in one or the other of its positions of extended transverse travel.

12. In agricultural machinery, the combination with a motor propelled farm tractor, of a wheeled frame secured to and projecting in advance of said tractor and adapted to be propelled thereby, stalk gathering mechanism provided on said frame, cutting mechanism for severing the stalks from the root portions thereof, shock forming means arranged upon said frame to receive stalks discharged from the gathering mechanism, means for effecting transverse travel of said shock forming means selectively to one side or the other of said tractor, and means operative to release the formed shocks from engagement with the shock forming means when the latter assumes an extended position to one side or the other of said tractor.

13. In agricultural machinery, the combination with a commercial form of farm tractor, a wheeled frame secured to said tractor and disposed longitudinally ahead of the latter, spaced gathering devices mounted upon the forward end of said frame and operating upon adjacent rows of corn to receive and straighten the individual stalks thereof to cause the latter to assume upright vertical positions with relation to the frame, cutting means carried by the frame for severing the stalks from the root portions thereof, a stalk receiver, means operative to transfer stalks from said gathering devices and deposit the same in standing vertical positions within said receiver and to compress said stalks into bunch or shock formations, and means operating at will to effect transverse travel of the formed shocks with respect to said frame to lateral positions of discharge at either side of said tractor.

14. In a corn shocking machine, the combination with a motor propelled frame, gathering means at the forward portion of said frame arranged to traverse adjoining rows of corn stalks to successively receive the individual stalks of such rows and straighten the same to assume substantially vertical positions in the gathering means, cutting devices adjacent said gathering means for severing the stalks from their root portions, a receiver including a movable base into which the several stalks are received following release from the cutting and gathering means, packing and transfer devices operating on the stalks to effect the transfer thereof from the gathering means into the receiver and to compress the stalks into shock formation while standing vertically in the receiver, and means operable to effect traverse of the movable base of said receiver laterally and selectively to either side of said frame so as to discharge completed shocks from the machine in a lateral direction irrespective of the direction of travel of the machine.

15. In a corn shocking machine, the combination with a motor propelled portable frame, a pair of gatherers mounted forwardly on said frame and spaced transversely thereof and adapted to successively receive the stalks of adjacent rows, said gathering means operating to cause the stalks to assume substantially upright positions, cutting appliances for severing the stalks, a stalk receiver on said frame, mechanism operating to effect the transfer of the stalks from said gatherers, position the same vertically within the receiver and to compress the stalks while in the receiver into bunch or shock formation, and means operating to shift the formed shocks laterally of said frame and thereby effect the discharge of the shocks from the machine selectively to either side thereof.

16. In agricultural machinery, the combination with a farm tractor, a corn shocking attachment for said tractor comprising a frame secured to the tractor and extending in advance thereof, a stalk gatherer on the forward end of said frame, cutting means adjacent the gatherer for severing the stalks from their roots, a stalk receiver into which the severed stalks are delivered from the gatherer, packing means operating on the stalks in the receiver to compress the stalks into vertically standing shocks, mechanism for effecting lateral traverse of the shocks to positions of discharge disposed to one side or the other of the path of travel of the tractor, and power transmitting means for effecting the operation of the cutting mechanism, the packing means and lateral shifting mechanism by power derived from said tractor.

17. In a corn shocking machine, the combination with a motor propelled frame, of a pair of stalk gatherers on the forward end of said frame transversely spaced to receive the stalks of adjoining rows of corn, said gatherers operating to cause the corn stalks received therein to assume standing or vertical positions, cutting mechanism cooperative with said gatherers for severing the stalks from their root portions, a shock former arranged to receive the stalks from the gatherers and compress the same into vertically standing shocks, and means for discharging the shocks so formed from the frame selectively at one side or the other of said frame.

18. In a corn shocker, the combination of a frame, a shock former platform mounted on the frame, stalk gathering means on the frame, stalk packing members carried on the frame above the platform to receive the stalks from the gathering means, and means for bodily moving the platform laterally outwardly to either side of the frame to discharge the shock, said packing members being swung outwardly by the shock as the platform moves to discharge the completed shock.

19. In a corn shocker, the combination of a frame, a shock former platform mounted on the frame, stalk gathering means on the frame, stalk packing members carried on opposite sides of the frame above the platform to receive the stalks from the gathering means, and means for bodily moving the platform laterally outwardly to either side of the frame to discharge a shock, said packing members being swung outwardly by the shock as the platform moves to discharge the completed shock.

20. In a corn shocker, the combination of a frame, a shock former platform mounted on the frame, stalk gathering means on the frame, stalk packing members at the sides of the frame for receiving the stalks from the gathering means to form a shock on the platform, means for bodily moving the platform laterally outwardly to either side of the frame to discharge a shock, said packing members being swung outwardly by the shock as the platform moves to release the shock as it is discharged, and means for returning the packing members and platform to normal position on the frame.

21. In a corn shocker, a frame, cutting and shock forming mechanism, a pair of wings on which the severed stalks are received in an upright position and formed into a shock, a pair of spaced members extending rearwardly from said frame, to which the said wings are hingedly connected and arranged to swing downwardly to discharge the shock between said wings.

22. In a corn shocker, a frame, a shock forming mechanism mounted on said frame, a shock support including a pair of spaced bars extended rearwardly from said frame, the said bars and frame forming a U-shaped structure, wings situated between said bars in a substantially horizontal plane when in a shock supporting position, and means for moving said wings to permit of the discharge of a formed shock.

In testimony whereof I affix my signature.

LEROY A. DEMOREST.